(12) United States Patent
Oshima et al.

(10) Patent No.: US 12,166,172 B2
(45) Date of Patent: Dec. 10, 2024

(54) ION CONDUCTOR MATERIAL AND BATTERY

(71) Applicant: Panasonic Intellectual Property Management Co., Ltd., Osaka (JP)

(72) Inventors: Tatsuya Oshima, Osaka (JP); Izuru Sasaki, Aichi (JP); Yuta Sugimoto, Hyogo (JP); Seiji Nishiyama, Osaka (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 493 days.

(21) Appl. No.: 17/518,588

(22) Filed: Nov. 4, 2021

(65) Prior Publication Data

US 2022/0077493 A1    Mar. 10, 2022

Related U.S. Application Data

(63) Continuation of application No. PCT/JP2020/018123, filed on Apr. 28, 2020.

(30) Foreign Application Priority Data

Jun. 26, 2019  (JP) ................. 2019-118813

(51) Int. Cl.
*H01M 10/0562* (2010.01)
*H01B 1/12* (2006.01)
*H01M 4/04* (2006.01)
*H01M 10/0525* (2010.01)

(52) U.S. Cl.
CPC ........ *H01M 10/0562* (2013.01); *H01B 1/122* (2013.01); *H01M 4/0407* (2013.01); *H01M 10/0525* (2013.01)

(58) Field of Classification Search
None
See application file for complete search history.

(56) References Cited

U.S. PATENT DOCUMENTS 6,428,935 B1    8/2002  Takada et al.
11,239,492 B2 *  2/2022  Asano ............... H01M 10/0525
(Continued)

FOREIGN PATENT DOCUMENTS

| CN | 106505199 B | 4/2019 |
| EP | 3965199 A1 | 3/2022 |
| JP | 2010-262764 | 11/2010 |

(Continued)

OTHER PUBLICATIONS

Extended European Search Report dated Aug. 26, 2022 for the related European Patent Application No. 20830570.6.

(Continued)

*Primary Examiner* — Carlos Barcena
(74) *Attorney, Agent, or Firm* — Rimon P.C.

(57) ABSTRACT

An ion conductor material includes a solid-electrolyte material and a resin binder. The solid-electrolyte material includes Li, M, and X. The M is at least one selected from the group consisting of metal and metalloid elements other than Li. The X is at least one selected from the group consisting of F, Cl, Br, and I. The molar ratio of a modification group included in the resin binder to the solid-electrolyte material is less than or equal to 0.0002.

11 Claims, 1 Drawing Sheet

(56) References Cited

U.S. PATENT DOCUMENTS

2019/0088995 A1  3/2019  Asano et al.
2019/0334174 A1  10/2019  Hasegawa et al.

FOREIGN PATENT DOCUMENTS

JP   2017-045611      3/2017
WO   2017/217079      12/2017
WO   2018/025582 A1   2/2018

OTHER PUBLICATIONS

R. Goncalves et al., "Poly(styrene-butene/ethylene-styrene): A New Polymer Binder for High-Performance Printable Lithium-Ion Battery Electrodes," ACS Applied Energy Materials, vol. 1, No. 7, Jul. 23, 2018, pp. 3331-3341, XP055739366.
International Search Report of PCT application No. PCT/JP2020/018123 dated Jul. 14, 2020.
English Translation of Chinese Search Report dated May 13, 2024 for the related Chinese Patent Application No. 202080021741.1.

* cited by examiner

ION CONDUCTOR MATERIAL AND BATTERY

BACKGROUND

1. Technical Field

The present disclosure relates to an ion conductor material and a battery.

2. Description of the Related Art

International Publication No. 2017/217079 discloses a battery including a solid electrolyte and a thermoplastic elastomer. The thermoplastic elastomer includes a functional group that increases adhesion strengths, such as the adhesion strength between the solid electrolyte and a positive electrode active material, the adhesion strength between the solid electrolyte particles, and the adhesion strength between the solid electrolyte and a negative electrode active material.

SUMMARY

One non-limiting and exemplary embodiment provides an ion conductor material that increases the charge-discharge efficiency of a battery.

In one general aspect, the techniques disclosed here feature an ion conductor material including a solid-electrolyte material and a resin binder. The solid-electrolyte material includes Li, M, and X. The M is at least one selected from the group consisting of metal and metalloid elements other than Li. The X is at least one selected from the group consisting of F, Cl, Br, and I. A molar ratio of a modification group included in the resin binder to the solid-electrolyte material is less than or equal to 0.0002.

According to the present disclosure, an ion conductor material that increases the charge-discharge efficiency of a battery may be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
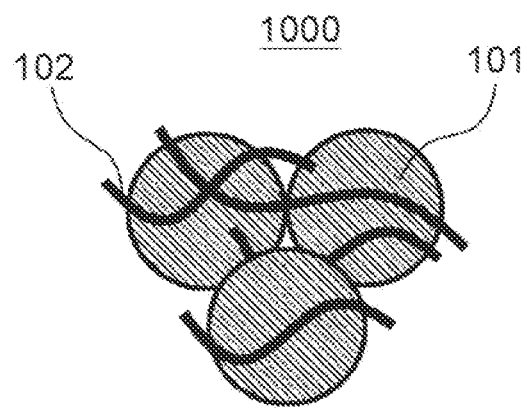
FIG. 1 is a schematic diagram illustrating the structure of an ion conductor material according to Embodiment 1.

An ion conductor material according to a first aspect of the present disclosure includes a solid-electrolyte material and a resin binder.

The solid-electrolyte material includes Li, M, and X.

The M is at least one selected from the group consisting of metal and metalloid elements other than Li.

The X is at least one selected from the group consisting of F, Cl, Br, and I.

The molar ratio of a modification group included in the resin binder to the solid-electrolyte material is less than or equal to 0.0002.

The ion conductor material according to the first aspect may increase the charge-discharge efficiency of a battery that includes the ion conductor material.

According to a second aspect of the present disclosure, for example, in the ion conductor material according to the first aspect, the solid-electrolyte material may be represented by Composition Formula (1) below,

$$Li_\alpha M_\beta X_\gamma \quad (1)$$

where the α, the β, and the γ all represent a value of greater than 0.

In the ion conductor material according to the second aspect, the ionic conductivity of the solid-electrolyte material is increased. This may increase ionic conductivity. Accordingly, the ion conductor material according to the second aspect may further increase the charge-discharge efficiency of a battery that includes the ion conductor material.

According to a third aspect of the present disclosure, for example, in the ion conductor material according to the first or second aspect, the M may include yttrium.

The ion conductor material according to the third aspect may further increase the charge-discharge efficiency of a battery that includes the ion conductor material.

According to a fourth aspect of the present disclosure, for example, in the ion conductor material according to any one of the first to third aspects, the resin binder may include a thermoplastic elastomer.

The ion conductor material according to the fourth aspect enables the packing density of the ion conductor material to be increased when thermal compression is performed in the production of a battery.

According to a fifth aspect of the present disclosure, for example, in the ion conductor material according to the fourth aspect, the thermoplastic elastomer may include styrene units.

Since a styrene-based thermoplastic elastomer has high electrochemical stability and a high binding strength, the ion conductor material according to the fifth aspect may enhance the cycle performance of a battery.

According to a sixth aspect of the present disclosure, for example, in the ion conductor material according to the fifth aspect, the thermoplastic elastomer may be styrene-ethylene-butylene-styrene block copolymer.

Since styrene-ethylene-butylene-styrene block copolymer has high electrochemical stability and a high binding strength, the ion conductor material according to the sixth aspect may enhance the cycle performance of a battery.

According to a seventh aspect of the present disclosure, for example, in the ion conductor material according to any one of the first to sixth aspects, the resin binder may have an acid value of less than or equal to 1 mg-CH$_3$ONa/g.

The ion conductor material according to the seventh aspect may further increase the charge-discharge efficiency of a battery that includes the ion conductor material.

A battery according to an eighth aspect of the present disclosure includes
 a positive electrode,
 a negative electrode, and
 an electrolyte layer interposed between the positive electrode and the negative electrode.

At least one selected from the group consisting of the positive electrode, the negative electrode, and the electrolyte layer includes the ion conductor material according to any one of the first to seventh aspects.

The battery according to the eighth aspect enables a markedly high charge-discharge efficiency to be achieved.

Embodiments of the present disclosure are described below with reference to the attached drawings.

Embodiment 1

FIG. 1 is a schematic diagram illustrating the structure of an ion conductor material 1000 according to Embodiment 1. The ion conductor material 1000 according to Embodiment 1 includes a solid-electrolyte material 101 and a resin binder 102. The solid-electrolyte material 101 includes Li, M, and X, where M is at least one selected from the group consisting of metal and metalloid elements other than Li and X is at least one selected from the group consisting of F, Cl, Br, and I. The molar ratio of a modification group included in the resin binder 102 to the solid-electrolyte material 101 is less than or equal to 0.0002.

Since the ion conductor material 1000 according to Embodiment 1 has the above-described structure, the ion conductor material 1000 may increase the charge-discharge efficiency of a battery (e.g., a solid-state secondary battery) that includes the ion conductor material 1000.

The term "metalloid element" used herein refers to B, Si, Ge, As, Sb, and Te.

The term "metal element" used herein refers to
(i) all of the elements included in Groups 1 to 12 of the periodic table excluding hydrogen and
(ii) all of the elements included in Groups 13 to 16 of the periodic table excluding B, Si, Ge, As, Sb, Te, C, N, P, O, S, and Se.

In other words, in the present disclosure, "metalloid elements" and "metal elements" are the group of elements that may be converted into a cation when combined with a halogen element to form an inorganic compound.

Details of the ion conductor material 1000 according to Embodiment 1 are described below. Hereinafter, the solid-electrolyte material 101 may be referred to as "halide solid-electrolyte material". The term "halide solid-electrolyte material" used herein refers to a solid-electrolyte material that includes a halogen element and does not include sulfur. The expression "solid-electrolyte material that does not include sulfur" used herein refers to a solid-electrolyte material represented by a composition formula that does not contain a sulfur element. Therefore, a solid-electrolyte material containing a trace amount of sulfur, that is, for example, having a sulfur content of less than or equal to 0.1% by mass is classified as a solid-electrolyte material that does not include sulfur. The halide solid-electrolyte material may further include oxygen as an anion other than a halogen element.

Halide Solid-Electrolyte Material

As described above, the halide solid-electrolyte material 101 is a material including Li, M, and X. The elements M and X are as described above. The above-described structure further increases the ionic conductivity of the halide solid-electrolyte material 101 and consequently further increases the ionic conductivity of the ion conductor material according to Embodiment 1. Therefore, the ion conductor material according to Embodiment 1 increases the charge-discharge efficiency of a battery that includes the ion conductor material. The ion conductor material according to Embodiment 1 also enhances the thermal stability of a battery that includes the ion conductor material. Furthermore, since the halide solid-electrolyte material 101 does not include sulfur, the ion conductor material according to Embodiment 1 reduces the generation of a hydrogen sulfide gas.

For example, the halide solid-electrolyte material 101 may be the material represented by Composition Formula (1) below.

$$Li_\alpha M_\beta X_\gamma \quad (1)$$

In Composition Formula (1) above, $\alpha$, $\beta$, and $\gamma$ all represent a value of greater than 0, and $\gamma$ may be, for example, 4 or 6.

The above-described structure increases the ionic conductivity of the halide solid-electrolyte material 101 and consequently increases the ionic conductivity of the ion conductor material according to Embodiment 1. Therefore, the ion conductor material according to Embodiment 1 further increases the charge-discharge efficiency of a battery that includes the ion conductor material.

In Composition Formula (1) above, the element M may include Y (i.e., yttrium). That is, the halide solid-electrolyte material 101 may include Y as a metal element.

The halide solid-electrolyte material 101 including Y may be represented by, for example, Composition Formula (2) below.

$$Li_a Me_b Y_c X_6 \quad (2)$$

where a, b, and c may satisfy a+mb+3c=6 and c>0; the element Me is at least one selected from the group consisting of metal and metalloid elements excluding Li and Y; and m represents the valence of the element Me. In the case where the element Me includes plural types of elements, mb represents the total of the compositional ratios of the elements multiplied by the valences of the respective elements. For example, in the case where Me includes elements Me1 and Me2, the compositional ratio and valence of the element Me1 are $b_1$ and $m_1$, respectively, and the compositional ratio and valence of the element Me2 are $b_2$ and $m_2$, respectively, $mb=m_1 b_1 + m_2 b_2$. In Composition Formula (2) above, the element X is at least one selected from the group consisting of F, Cl, Br, and I.

The element Me may be, for example, at least one selected from the group consisting of Mg, Ca, Sr, Ba, Zn, Sc, Al, Ga, Bi, Zr, Hf, Ti, Sn, Ta, Gd, and Nb.

For example, the materials described below may be used as a halide solid-electrolyte material 101. The following materials further increase the ionic conductivity of the halide solid-electrolyte material 101 and may further increase the ionic conductivity of the ion conductor material according to Embodiment 1 consequently. Therefore, the ion conductor material according to Embodiment 1 further increases the charge-discharge efficiency of a battery that includes the ion conductor material.

The halide solid-electrolyte material 101 may be the material represented by Composition Formula (A1) below.

$$Li_{6-3d} Y_d X_6 \quad (A1)$$

In Composition Formula (A1), the element X is at least one selected from the group consisting of Cl, Br, and I. In Composition Formula (A1), d satisfies 0<d<2.

The halide solid-electrolyte material 101 may be the material represented by Composition Formula (A2) below.

$$Li_3 Y X_6 \quad (A2)$$

In Composition Formula (A2), the element X is at least one selected from the group consisting of Cl, Br, and I.

The halide solid-electrolyte material 101 may be the material represented by Composition Formula (A3) below.

$$Li_{3-3\delta} Y_{1+\delta} Cl_6 \quad (A3)$$

In Composition Formula (A3), $\delta$ satisfies 0<$\delta$≤0.15.

The halide solid-electrolyte material 101 may be the material represented by Composition Formula (A4) below.

$$Li_{3-3\delta}Y_{1+\delta}Br_6 \quad (A4)$$

In Composition Formula (A4), δ satisfies 0<δ≤0.25.

The halide solid-electrolyte material 101 may be the material represented by Composition Formula (A5) below.

$$Li_{3-3\delta+a}Y_{1+\delta-a}Me_aCl_{6-x-y}Br_xI_y \quad (A5)$$

In Composition Formula (A5), the element Me is at least one selected from the group consisting of Mg, Ca, Sr, Ba, and Zn.

In Composition Formula (A5), $-1<\delta<2$, $0<a<3$, $0<(3-3\delta+a)$;

$0<(1+\delta-a)$, $0\leq x\leq 6$, $0\leq\leq 6$, and $(x+y)\leq 6$ are satisfied.

The halide solid-electrolyte material 101 may be the material represented by Composition Formula (A6) below.

$$Li_{3-3\delta}Y_{1+\delta-a}Me_aCl_{6-x-y}Br_xI_y \quad (A6)$$

In Composition Formula (A6), the element Me is at least one selected from the group consisting of Al, Sc, Ga, and Bi.

In Composition Formula (A6), $-1<\delta<1$, $0<a<2$, $0\leq(1+\delta-a)$, $0\leq x\leq 6$, $0\leq y\leq 6$, and $(x+y)\leq 6$ are satisfied.

The halide solid-electrolyte material 101 may be the material represented by Composition Formula (A7) below.

$$Li_{3-3\delta-a}Y_{1+\delta-a}Me_aCl_{6-x-y}Br_xI_y \quad (A7)$$

In Composition Formula (A7), the element Me is at least one selected from the group consisting of Zr, Hf, and Ti.

In Composition Formula (A7), $-1<\delta<1$, $0<a<1.5$, $0<(3-3\delta-a)$, $0<(1+\delta-a)$, $0\leq x\leq 6$, $0\leq y\leq 6$, and $(x+y)\leq 6$ are satisfied.

The halide solid-electrolyte material 101 may be the material represented by Composition Formula (A8) below.

$$Li_{3-3\delta-2a}Y_{1+\delta-a}Me_aCl_{6-x-y}Br_xI_y \quad (A8)$$

In Composition Formula (A8), the element Me is at least one selected from the group consisting of Ta and Nb.

In Composition Formula (A8), $-1<\delta<1$, $0<a<1.2$, $0<(3-3\delta-2a)$, $0<(1+\delta-a)$, $0\leq x\leq 6$, $0\leq y\leq 6$, and $(x+y)\leq 6$ are satisfied.

Specific examples of the halide solid-electrolyte material 101 include $Li_3YX_6$, $Li_2MgX_4$, $Li_2FeX_4$, $Li(Al, Ga, In)X_4$, and $Li_3(Al, Ga, In)X_6$. In the above materials, the element X is at least one selected from the group consisting of F, Cl, Br, and I. When elements included in a formula are denoted as "(Al, Ga, In)" or the like in the present disclosure, this notation represents at least one element selected from the group consisting of the parenthesized elements. In other words, "(Al, Ga, In)" is synonymous with "at least one selected from the group consisting of Al, Ga, and In". The same applies to other elements.

Resin Binder

As described in the section "Description of the Related Art", International Publication No. 2017/217079 discloses a battery that includes a solid electrolyte and a thermoplastic elastomer including a functional group. In the battery discloses in International Publication No. 2017/217079, the solid electrolyte is specifically a sulfide solid electrolyte or an oxide solid electrolyte. That is, the battery discloses in International Publication No. 2017/217079 includes a mixture of a sulfide or oxide solid electrolyte with a resin binder including a modification group. According to International Publication No. 2017/217079, since the battery disclosed in International Publication No. 2017/217079 has the above-described structure, adhesion strength and battery characteristics, which are in a trade-off relationship, can be both enhanced.

The inventors of the present disclosure studied a battery including a solid-electrolyte material and a resin binder and consequently found that, in the case where a halide solid-electrolyte material is mixed with a resin binder including a modification group, the ionic conductivity of the solid-electrolyte material is reduced and, accordingly, the charge-discharge efficiency of the battery is reduced disadvantageously. It is considered that this issue is caused as a result of the halide solid-electrolyte material reacting or interacting with the modification group of the resin binder. More specifically, it is considered that the above issue is caused as a result of the reaction or interaction of binding sites included in the halide solid-electrolyte material which have a strong ionic bond character, such as M-X, with high-polarity binding sites included in the modification group of the resin binder which are constituted by O, N, or the like having a relatively high electronegativity. It is considered that the above-described phenomenon does not occur at binding sites having a strong covalent bond character, such as a P—S bond included in a sulfide solid-electrolyte material and an M-O bond included in an oxide solid-electrolyte material. That is, the above-described issue is considered peculiar to halide solid-electrolyte materials.

The inventors of the present disclosure conducted further studies on the basis of the above findings and consequently found that, even in the case where the halide solid-electrolyte material is used in combination with a resin binder, the reduction in the ionic conductivity of the halide solid-electrolyte material can be limited by reducing the amount of the modification group of the resin binder relative to the amount of the halide solid-electrolyte material, that is, specifically, by adjusting the molar ratio of the modification group included in the resin binder to the halide solid-electrolyte material to be less than or equal to 0.0002. As described above, in the ion conductor material 1000 according to Embodiment 1, the molar ratio of a modification group included in the resin binder 102 to the halide solid-electrolyte material 101 is limited to be less than or equal to 0.0002. This enables the ion conductor material 1000 according to Embodiment 1 to increase the charge-discharge efficiency of the battery while maintaining the strength of binding of the halide solid-electrolyte material 101.

Hereinafter, the expression "molar ratio of a modification group included in the resin binder 102 to the halide solid-electrolyte material 101" may be referred to simply as "molar ratio of the modification group".

In the ion conductor material 1000 according to Embodiment 1, the molar ratio of the modification group may be 0. In other words, the resin binder 102 does not necessarily include a modification group. When the resin binder 102 does not include a modification group, the reduction in the ionic conductivity of the halide solid-electrolyte material 101 may be further limited. This enables the ion conductor material 1000 according to Embodiment 1 to further increase the charge-discharge efficiency of a battery while maintaining the strength of binding of the halide solid-electrolyte material 101. In the ion conductor material 1000 according to Embodiment 1, the molar ratio of the modification group may be greater than or equal to 0.

In the ion conductor material 1000 according to Embodiment 1, the resin binder 102 may include a modification group such that the molar ratio of the modification group is less than or equal to 0.0002. When the molar ratio of the modification group is less than or equal to 0.0002, the ion conductor material 1000 according to Embodiment 1 increases the charge-discharge efficiency of a battery while maintaining the strength of binding of the halide solid-electrolyte material 101.

Examples of the resin binder 102 used in Embodiment 1 include polyvinylidene fluoride (PVdF), polytetrafluoroethylene (PTFE), polyethylene, polypropylene, an aramid resin, polyamide, polyimide, polyamide imide, polyacrylonitrile, polyacrylic acid, polymethyl acrylate ester, polyethyl acrylate ester, polyhexyl acrylate ester, polymethacrylic acid, polymethyl methacrylate ester, polyethyl methacrylate ester, polyhexyl methacrylate ester, polyvinyl acetate, polyvinylpyrrolidone, polyether, polycarbonate, polyethersulfone, polyetherketone, polyether ether ketone, polyphenylene sulfide, hexafluoropolypropylene, a styrene butadiene rubber, carboxymethyl cellulose, and ethyl cellulose. A copolymer including two or more monomers selected from the group consisting of tetrafluoroethylene, hexafluoroethylene, hexafluoropropylene, perfluoroalkyl vinyl ether, vinylidene fluoride, chlorotrifluoroethylene, ethylene, propylene, butadiene, styrene, pentafluoropropylene, fluoromethyl vinyl ether, acrylic acid ester, acrylic acid, and hexadiene may also be used. The above polymers may be used alone or in combination of two or more.

The resin binder 102 used in Embodiment 1 may be, but not limited to, an elastomer because an elastomer has a high binding capacity. Note that an elastomer is an elastic polymer. The elastomer used as a resin binder 102 may be either a thermoplastic elastomer or a thermosetting elastomer. The resin binder 102 may include a thermoplastic elastomer. Examples of the elastomer include styrene-ethylene-butylene-styrene block copolymer (SEBS), styrene-ethylene-propylene-styrene block copolymer (SEPS), styrene-ethylene-ethylene-propylene-styrene block copolymer (SEEPS), a butylene rubber (BR), an isoprene rubber (IR), a chloroprene rubber (CR), an acrylonitrile butadiene rubber (NBR), a styrene-butylene rubber (SBR), styrene-butadiene-styrene block copolymer (SBS), styrene-isoprene-styrene block copolymer (SIS), a hydrogenated isoprene rubber (HIR), a hydrogenated butyl rubber (HIIR), a hydrogenated nitrile rubber (HNBR), and a hydrogenated styrene-butylene rubber (HSBR). Two or more elastomers selected from the above may be used in a mixture. Examples of the thermoplastic elastomer include SEBS, SEPS, SEEPS, SBS, and SIS. In the case where the resin binder 102 includes a thermoplastic elastomer, the packing density of the ion conductor material 1000 can be increased when thermal compression is performed in the production of a battery.

The thermoplastic elastomer included in the resin binder 102 may be a styrene-based thermoplastic elastomer that includes styrene. Since a styrene-based thermoplastic elastomer has high electrochemical stability and a high binding strength, the cycle performance of a battery can be enhanced.

The thermoplastic elastomer included in the resin binder 102 may be SEBS. Since SEBS has high electrochemical stability and a high binding strength, the cycle performance of a battery can be further enhanced.

The resin binder 102 used in Embodiment 1 may be, for example, "Tuftec" produced by Asahi Kasei Corporation.

The modification group included in the resin binder 102 used in Embodiment 1 is a functional group formed as a result of the entirety or a part of the repeating unit of the polymer chain or a terminal of the polymer chain being chemically modified by substitution, addition, or the like. Examples of the modification group include a functional group including an element having a relatively high electronegativity, such as O or N. When the resin binder includes such a functional group, a polarity can be imparted to the resin binder. Examples of the modification group include a carboxylic group, a maleic anhydride group, an acyl group, a hydroxyl group, a sulfo group, a sulfanyl group, a phosphate group, a phosphonate group, an isocyanate group, an epoxy group, a silyl group, an amino group, a nitrile group, and a nitro group.

Examples of the method for adjusting the amount of the modification group included in the resin binder 102 used in Embodiment 1 include a method in which the amount of the modification group introduced to the resin binder is controlled and a method in which an unmodified resin binder is added to the resin binder including a modification group in order to perform dilution.

The molar ratio of the modification group can be calculated by, for example, the following method. The resin binder 102 is extracted with a solvent that does not dissolve the halide solid-electrolyte material 101 and dissolves the resin binder 102, that is, for example, with an aromatic solvent such as toluene. The amount of the modification group by mole included in the extracted resin binder 102 is measured by infrared spectroscopy (IR). The amount of the remaining halide solid-electrolyte material 101 by mole, which has not been extracted, is measured. The amount of the modification group by mole is divided by the amount of the halide solid-electrolyte material 101 by mole to obtain the molar ratio of the modification group.

In the case where the amount of the halide solid-electrolyte material 101 by mole, the acid values of all the resin components constituting the resin binder 102, and the mass proportions of the resin components are known, the molar ratio of the modification group can be calculated by the method described in Examples below using the amount of the halide solid-electrolyte material 101 by mole and the acid values and mass proportions of the resin components, instead of the above method.

In the ion conductor material 1000 according to Embodiment 1, the acid value of the resin binder 102 may be less than or equal to 1 mg-$CH_3ONa$/g. Note that the unit "mg-$CH_3ONa$/g" is used for acid value and expresses the amount of "$CH_3ONa$" required for neutralizing modification groups included in 1 g of a target compound (in this case, the resin binder 102) in milligrams. When the acid value of the resin binder 102 is less than or equal to 1 mg-$CH_3ONa$/g, the ion conductor material 1000 according to Embodiment 1 increases the charge-discharge efficiency of a battery while maintaining the strength of binding of the halide solid-electrolyte material 101.

The acid value of the resin binder 102 can be determined by titration, such as a titrimetric method described in Japanese Patent No. 4946387.

The weight-average molecular weight of the resin binder 102 used in Embodiment 1 may be, for example, 1,000 to 1,000,000 or 10,000 to 500,000. When the weight-average molecular weight of the resin binder 102 is greater than or equal to 1,000, the adhesive strength between particles of the halide solid-electrolyte material 101 can be increased to a sufficient degree. When the weight-average molecular weight of the resin binder 102 is less than or equal to 1,000,000, the resin binder 102 does not block the ionic conduction between particles of the halide solid-electrolyte material 101 and, consequently, the charge-discharge characteristics of a battery can be enhanced. The weight-average molecular weight of the resin binder 102 may be, for example, a weight-average molecular weight determined by gel permeation chromatography (GPC) using chloroform as an eluent, in terms of polystyrene.

The method for mixing the halide solid-electrolyte material 101 and the resin binder 102 with each other in the production of the ion conductor material 1000 according to Embodiment 1 is not limited. For example, they may be mechanically pulverized and mixed in a dry process. This method enables the ion conductor material 1000 according to Embodiment 1 to be prepared in an easy and simple manner. Alternatively, a wet process in which the halide solid-electrolyte material is dispersed in a solution or dispersion liquid containing the resin binder and drying is subsequently performed may be used. This method enables the resin binder and the halide solid-electrolyte material to be uniformly mixed in an easy and simple manner and thereby increases the strength of binding of the halide solid-electrolyte material. Examples of the solvent used in the above method include a solvent that does not react with a halide solid electrolyte, that is, for example, an aromatic solvent such as toluene.

The method for producing the halide solid-electrolyte material 101 is described below. The method for producing the halide solid-electrolyte material represented by Composition Formula (1) above is described below as an example.

Plural types of raw material powders of binary halides are prepared in accordance with the intended composition. Note that a binary halide is a compound consisting of two elements including a halogen element. For example, in the preparation of $Li_3YCl_6$, a raw material power of LiCl and a raw material powder of $YCl_3$ are prepared at a molar ratio of 3:1. The types of elements "M" and "X" in Composition Formula (1) can be determined by selecting the types of the above raw material powders. The values "α", "β", and "γ" in Composition Formula (1) can be adjusted by changing the types and compounding ratios of the raw material powders and the synthesis process.

After the raw material powders have been mixed and pulverized, they are caused to react with one another by mechanochemical milling. Alternatively, after the raw material powders have been mixed and pulverized, heat treatment may be performed in vacuum or an inert atmosphere. As for heat-treatment conditions, for example, the heat treatment may be performed at 100° C. to 550° C. for 1 hour or more. The halide solid-electrolyte material can be produced by the above-described method.

The structure of the crystal phase (i.e., crystal structure) included in the halide solid-electrolyte material can be adjusted or determined by the method by which the raw material powders are caused to react with one another and the conditions under which the above reaction is conducted.

Embodiment 2

Embodiment 2 is described below. Descriptions that overlap those of Embodiment 1 above are omitted appropriately.

Figure 2:
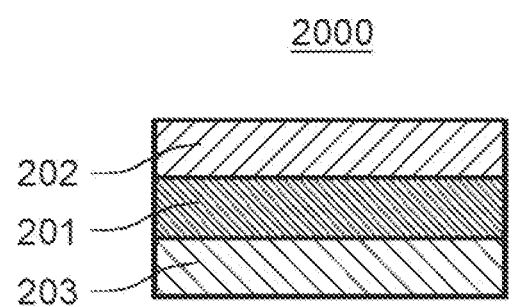
FIG. 2 is a cross-sectional view of a battery according to Embodiment 2, illustrating the schematic structure of the battery.

FIG. 2 is a cross-sectional view of a battery 2000 according to Embodiment 2, illustrating the schematic structure of the battery 2000.

The battery 2000 according to Embodiment 2 includes a positive electrode 202, a negative electrode 203, and an electrolyte layer 201.

At least one selected from the group consisting of the positive electrode 202, the negative electrode 203, and the electrolyte layer 201 includes the ion conductor material 1000 according to Embodiment 1.

The electrolyte layer 201 is interposed between the positive electrode 202 and the negative electrode 203.

The above-described structure increases the charge-discharge efficiency of the battery according to Embodiment 2.

In the battery 2000 according to Embodiment 2, the positive electrode 202 may include the ion conductor material 1000 according to Embodiment 1.

In such a case, the charge-discharge efficiency of the battery can be further increased.

In the battery 2000 according to Embodiment 2, the electrolyte layer 201 may include the ion conductor material 1000 according to Embodiment 1.

The electrolyte layer 201 may be composed only of the ion conductor material 1000 according to Embodiment 1.

In such a case, the charge-discharge efficiency of the battery according to Embodiment 2 can be further increased.

The electrolyte layer 201 is a layer including an electrolyte material. The electrolyte material is, for example, a solid-electrolyte material. That is, the electrolyte layer 201 may be a solid-electrolyte layer. Examples of the solid-electrolyte material included in the electrolyte layer 201 include a sulfide solid-electrolyte material, an oxide solid-electrolyte material, a halide solid-electrolyte material, a polymer solid-electrolyte material, and a complex hydride solid-electrolyte material. The solid-electrolyte material may be, for example, a halide solid-electrolyte material.

The term "oxide solid-electrolyte material" used herein refers to a solid-electrolyte material that includes oxygen. The oxide solid-electrolyte material may further include an anion other than sulfur or a halogen element, as an anion other than oxygen.

The "halide solid-electrolyte material" is as described in Embodiment 1 and corresponds to the solid-electrolyte material 101 included in the ion conductor material 1000 according to Embodiment 1.

Examples of the sulfide solid-electrolyte material include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Optionally, for example, LiX, $Li_2O$, $MO_q$, and/or $Li_pMO_q$ may be added to the above materials. The element X in "LiX" is at least one selected from the group consisting of F, Cl, Br, and I. The element M in "$MO_q$" and "$Li_pMO_q$" is at least one selected from the group consisting of P, Si, Ge, B, Al, Ga, In, Fe, and Zn. In "$MO_q$" and "$Li_pMO_q$", both p and q represent a natural number.

Examples of the oxide solid-electrolyte material include NASICON solid-electrolyte materials, such as $LiTi_2(PO_4)_3$ and element substitution products thereof; perovskite solid-electrolyte materials, such as $(LaLi)TiO_3$; LISICON solid-electrolyte materials, such as $Li_{14}ZnGe_4O_{16}$, $Li_4SiO_4$, $LiGeO_4$, and element substitution products thereof; garnet solid-electrolyte materials, such as $Li_7La_3Zr_2O_{12}$ and element substitution products thereof; $Li_3PO_4$ and N-substitution products thereof; and glass and glass ceramics including a Li—B—O compound, such as $LiBO_2$ or $LisBO_3$, as a base and $Li_2SO_4$, $Li_2CO_3$, or the like as an additive.

The polymer solid electrolyte may be, for example, a compound produced from a high-molecular-weight compound and a lithium salt. The high-molecular-weight compound may have an ethylene oxide structure. A high-molecular-weight compound having an ethylene oxide structure is capable of including a large amount of lithium salt and therefore further increases ionic conductivity. Examples of the lithium salt include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. The above lithium salts may be used alone or in combination of two or more.

Examples of the complex hydride solid electrolyte include $LiBH_4$-LiI and $LiBH_4$—$P_2S_5$.

The electrolyte layer 201 may include the solid-electrolyte material as a principal constituent. That is, the amount of the solid-electrolyte material included in the electrolyte layer 201 may be, for example, greater than or equal to 70% (greater than or equal to 70% by mass) of the total mass of the electrolyte layer 201.

In such a case, the charge-discharge characteristics of the battery can be further increased.

The electrolyte layer 201 may further include, in addition to the solid-electrolyte material as a principal constituent, inevitable impurities, the starting materials used in the synthesis of the solid-electrolyte material, by-products and decomposition products produced from the synthesis, and the like.

The amount of the solid-electrolyte material included in the electrolyte layer 201 may be, for example, 100%(100% by mass) of the total mass of the electrolyte layer 201 excluding inevitable impurities.

In such a case, the charge-discharge characteristics of the battery can be further increased.

The electrolyte layer 201 may include two or more types of solid-electrolyte materials selected from the above-described examples of the solid-electrolyte material. For example, the electrolyte layer 201 may include the halide solid-electrolyte material and the sulfide solid-electrolyte material.

The thickness of the electrolyte layer 201 may be greater than or equal to 1 µm and less than or equal to 300 µm. When the thickness of the electrolyte layer 201 is greater than or equal to 1 µm, the likelihood of shorting between the positive electrode 202 and the negative electrode 203 is reduced. When the thickness of the electrolyte layer 201 is less than or equal to 300 µm, the battery can be readily operated at a high power. That is, when the thickness of the electrolyte layer 201 is adjusted to be adequate, the safety of the battery can be maintained at a sufficient level and the battery can be operated at a high power.

The shape of the solid-electrolyte material included in the battery 2000 is not limited. Examples of the shape of the solid-electrolyte material include acicular, spherical, and oval. The shape of the solid-electrolyte material may be, for example, particulate.

At least one of the positive electrode 202 and the negative electrode 203 may include an electrolyte material, such as a solid-electrolyte material. The solid-electrolyte material may be the solid-electrolyte material described above as an example of the material constituting the electrolyte layer 201. In such a case, the lithium ion conductivity of the inside of the positive electrode 202 or negative electrode 203 can be increased and, consequently, the battery can be operated at a high power.

The positive electrode 202 includes, for example, a material capable of occluding and releasing metal ions (e.g., lithium ion) as a positive electrode active material. Examples of the positive electrode active material include a lithium transition metal oxide, a transition metal fluoride, a polyanionic material, a fluorinated polyanionic material, a transition metal sulfide, a transition metal oxysulfide, and a transition metal oxynitride. Examples of the lithium transition metal oxide include $Li(Ni, Co, Al)O_2$ and $LiCoO_2$. In the case where, for example, a lithium transition metal oxide is used as a positive electrode active material, the manufacturing costs can be reduced and average discharge voltage can be increased. In order to increase the energy density of the battery, lithium nickel cobalt manganese oxide may be used as a positive electrode active material. For example, the positive electrode active material may be $Li(Ni,Co,Mn)O_2$.

In the case where the shape of the solid-electrolyte material included in the positive electrode 202 is particulate (e.g., spherical), the median diameter of the solid-electrolyte material may be less than or equal to 100 µm. When the median diameter of the solid-electrolyte material is less than or equal to 100 µm, the positive electrode active material and the solid-electrolyte material can be dispersed in the positive electrode 202 in a suitable manner. This enhances the charge-discharge characteristics of the battery.

The solid-electrolyte material included in the positive electrode 202 may have a smaller median diameter than the positive electrode active material. This enables the solid-electrolyte material and the positive electrode active material to be dispersed in a suitable manner.

The median diameter of the positive electrode active material may be greater than or equal to 0.1 µm and less than or equal to 100 µm. When the median diameter of the positive electrode active material is greater than or equal to 0.1 µm, the positive electrode active material and the solid-electrolyte material can be dispersed in the positive electrode 202 in a suitable manner. This enhances the charge-discharge characteristics of the battery. When the median diameter of the positive electrode active material is less than or equal to 100 µm, the speed at which lithium diffuses in the positive electrode active material is increased. This enables the battery to be operated at a high power.

A median diameter is the particle size at which the cumulative volume reaches 50% in a volume-basis particle size distribution. The volume-basis particle size distribution is determined by laser diffraction scattering method. The same applies to the other materials described below.

When the volume fractions of the positive electrode active material and the solid-electrolyte material included in the positive electrode 202 are defined as "v1:100-v1", $30 \leq v1 \leq 95$ may be satisfied, where v1 represents the volume fraction of the positive electrode active material with the total volume of the positive electrode active material and the solid-electrolyte material included in the positive electrode 202 being 100. When $30 \leq v1$ is satisfied, the energy density of the battery can be maintained at a sufficient level. When $v1 \leq 95$ is satisfied, the battery can be more readily operated at a high power.

The thickness of the positive electrode 202 may be greater than or equal to 10 µm and less than or equal to 500 µm. When the thickness of the positive electrode is greater than or equal to 10 µm, the energy density of the battery can be readily maintained at a sufficient level. When the thickness of the positive electrode is less than or equal to 500 µm, the battery can be more readily operated at a high power.

The negative electrode 203 includes, for example, a material capable of occluding and releasing metal ions (e.g., lithium ion) as a negative electrode active material. Examples of the negative electrode active material include a metal material, a carbon material, an oxide, a nitride, a tin compound, and a silicon compound. The metal material may be a single-element metal or an alloy. Examples of the metal material include lithium metal and a lithium alloy. Examples of the carbon material include natural graphite, coke, graphitizing carbon, carbon fibers, spherical carbon, artificial graphite, and amorphous carbon. The use of silicon (Si), tin (Sn), a silicon compound, a tin compound, or the like increases capacity density.

The median diameter of the negative electrode active material may be greater than or equal to 0.1 µm and less than or equal to 100 µm. When the median diameter of the negative electrode active material is greater than or equal to 0.1 µm, the negative electrode active material and the solid-electrolyte material can be dispersed in the negative electrode 203 in a suitable manner. This enhances the charge-discharge characteristics of the battery. When the median diameter of the negative electrode active material is less than or equal to 100 µm, the speed at which lithium diffuses in the negative electrode active material is increased. This enables the battery to be operated at a high power.

The negative electrode active material may have a larger median diameter than the solid-electrolyte material. In such a case, the solid-electrolyte material and the negative electrode active material can be dispersed in a suitable manner.

When the volume fractions of the negative electrode active material and the solid-electrolyte material included in the negative electrode 203 are defined as "v2:100-v2", $30 \leq v2 \leq 95$ may be satisfied, where v2 represents the volume fraction of the negative electrode active material with the total volume of the negative electrode active material and the solid-electrolyte material included in the negative electrode 203 being 100. When $30 \leq v2$ is satisfied, the energy density of the battery can be maintained at a sufficient level. When $v2 < 95$ is satisfied, the battery can be more readily operated at a high power.

The thickness of the negative electrode 203 may be greater than or equal to 10 µm and less than or equal to 500 µm. When the thickness of the negative electrode is greater than or equal to 10 µm, the energy density of the battery can be readily maintained at a sufficient level. When the thickness of the negative electrode is less than or equal to 500 µm, the battery can be more readily operated at a high power.

The positive and the negative electrode active materials may be coated with a coating material in order to reduce the interface resistance between the active materials and the solid-electrolyte material. The coating material may be a material having low electron conductivity. Examples of the coating material include an oxide material and an oxide solid-electrolyte material.

Examples of the oxide material used as a coating material include $SiO_2$, $Al_2O_3$, $TiO_2$, $B_2O_3$, $Nb_2O_5$, $WO_3$, and $ZrO_2$.

Examples of the oxide solid-electrolyte material used as a coating material include Li—Nb—O compounds, such as $LiNbO_3$; Li—B—O compounds, such as $LiBO_2$ and $Li_3BO_3$; Li—Al—O compounds, such as $LiAlO_2$; Li—Si—O compounds, such as $Li_4SiO_4$; Li—Ti—O compounds, such as $Li_2SO_4$ and $Li_4Ti_5O_{12}$; Li—Zr—O compounds, such as $Li_2ZrO_3$; Li—Mo—O compounds, such as $Li_2MoO_3$; Li—V—O compounds, such as $LiV_2O_5$; and Li—W—O compounds, such as $Li_2WO_4$. Since the oxide solid-electrolyte material has high ionic conductivity and high stability at high potentials, using the above oxide solid-electrolyte material as a coating material further increases the charge-discharge efficiency of the battery.

At least one selected from the group consisting of the positive electrode 202, the electrolyte layer 201, and the negative electrode 203 may include a nonaqueous electrolyte solution, a gel electrolyte, or an ionic liquid in order to facilitate the occlusion and release of lithium ions and thereby enhance the output characteristic of the battery.

The nonaqueous electrolyte solution includes a nonaqueous solvent and a lithium salt dissolved in the nonaqueous solvent. Examples of the nonaqueous solvent include a cyclic carbonate ester solvent, a chain carbonate ester solvent, a cyclic ether solvent, a chain ether solvent, a cyclic ester solvent, a chain ester solvent, and a fluorine solvent. Examples of the cyclic carbonate ester solvent include ethylene carbonate, propylene carbonate, and butylene carbonate. Examples of the chain carbonate ester solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethyl carbonate. The above nonaqueous solvents may be used alone or in a mixture of two or more.

The nonaqueous electrolyte solution may include at least one fluorine solvent selected from the group consisting of fluoroethylene carbonate, methyl fluoropropionate, fluorobenzene, fluoroethyl methyl carbonate, and fluorodimethyl carbonate.

Examples of the lithium salt include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. The above lithium salts may be used alone or in a mixture of two or more. The concentration of the lithium salt may be, for example, greater than or equal to 0.5 mol/liter and less than or equal to 2 mol/liter.

The gel electrolyte may be a material produced by impregnating a polymer material with a nonaqueous electrolyte solution. Examples of the polymer material include polyethylene oxide, polyacrylonitrile, polyvinylidene fluoride, polymethyl methacrylate, and a polymer including an ethylene oxide bond.

Examples of the cation constituting the ionic liquid include aliphatic chain quaternary cations, such as tetraalkylammonium and tetraalkylphosphonium; aliphatic cyclic ammonium salts, such as pyrrolidinium salts, morpholinium salts, imidazolinium salts, tetrahydropyrimidinium salts, piperazinium salts, and piperidinium salts; and nitrogen-containing heterocyclic aromatic cations, such as pyridinium salts and imidazolium salts. Examples of the anion constituting the ionic liquid include $PF_6^-$, $BF_4^-$, $SbF_6^-$, $AsF_6^-$, $SO_3CF_3^-$, $N(SO_2F)_2^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may include a lithium salt.

At least one of the positive electrode 202 and the negative electrode 203 may include a conductant agent in order to enhance electron conductivity. Examples of the conductant agent include graphite materials, such as natural graphite and artificial graphite; carbon blacks, such as acetylene black and Ketjenblack; conductive fibers, such as carbon fibers and metal fibers; conductive powders, such as a fluorocarbon powder and an aluminum powder; conductive whiskers, such as zinc oxide whiskers and potassium titanate whiskers; conductive metal oxides, such as titanium oxide; and conductive polymers, such as polyaniline, polypyrrole, and polythiophene. Using a carbon material as a conductant agent reduces the costs.

Examples of the shape of the battery include coin-like, cylindrical, rectangular, sheet-like, button-like, flat, and multilayer.

The battery according to Embodiment 2 may be produced by, for example, preparing a material for the positive electrode, a material for the electrolyte layer, and a material for the negative electrode and forming a multilayer body including a positive electrode, an electrolyte layer, and a negative electrode stacked on top of one another in this order by a publicly known method.

EXAMPLES

Details of the present disclosure are described with reference to Examples and Comparative Examples below. The ion conductor material and battery according to the present disclosure are not limited by Examples below.

Example 1

Preparation of Halide Solid-Electrolyte Material $YCl_3$, LiCl, and LiBr were weighed as raw-material powders in an argon glovebox having a dew point of less than or equal to −60° C. such that a molar ratio between $YCl_3$, LiCl, and LiBr was $YCl_3$:LiCl:LiBr=1:1:2. Subsequently, the above raw-material powders were mixed with one another. The resulting mixture was heat-treated for 2 hours at 520° C. in an electric furnace to form a halide solid-electrolyte material $Li_3YBr_2Cl_4$ (hereinafter, referred to as "LYBC"). To LYBC, p-chlorotoluene was added. The resulting mixture was pulverized with a wet pulverization-dispersion machine and then dried. Hereby, a LYBC fine powder (median diameter $D_{50}$: 0.4 µm) was prepared.

Preparation of Sulfide Solid-Electrolyte Material $Li_2S$ and $P_2S_5$ were weighed as raw-material powders in an argon glovebox having a dew point of less than or equal to −60° C. such that a molar ratio between $Li_2S$ and $P_2S_5$ was $Li_2S$:$P_2S_5$=75:25. The above raw-material powders were charged into a mortar and subsequently pulverized and mixed with each other. The resulting mixture was milled with a planetary ball mill (Model "P-7" produced by Fritsch) at 510 rpm for 10 hours. The resulting glassy solid electrolyte was heated at 270° C. for 2 hours in an inert atmosphere. Hereby, $Li_2S$—$P_2S_5$ (hereinafter, referred to as "LPS") that was a glass-ceramic solid electrolyte was prepared.

Preparation of Positive Electrode Including Ion Conductor Material

The LYBC fine powder and unmodified SEBS ("Tuftec N504" produced by Asahi Kasei Corporation, acid value: 0 mg-$CH_3ONa$/g) were weighed in an argon glovebox having a dew point of less than or equal to −60° C. such that a mass ratio between the LYBC fine powder and the unmodified SEBS was LYBC fine powder:unmodified SEBS=1:0.022. The weighed LYBC fine powder and unmodified SEBS were dissolved or dispersed in a solvent tetralin to prepare a slurry of an ion conductor material. In this ion conductor material, the halide solid-electrolyte material was LYBC and the resin binder was unmodified SEBS. Subsequently, the slurry of the ion conductor material and Li(Ni, Co, Mn)$O_2$ were weighed such that a mass ratio between LYBC and Li(Ni, Co, Mn)$O_2$ was LYBC:Li(NiCoMn)$O_2$=1:4.42. The weighed slurry of the ion conductor material and Li(Ni, Co, Mn)$O_2$ were kneaded with a planetary centrifugal mixer ("ARE-310" produced by THINKY) at 1600 rpm for 6 minutes to prepare a positive electrode slurry. A copper foil (thickness: 12 µm) was used as a current collector. The positive electrode slurry was applied to the copper foil. The resulting coating film was dried in vacuum at 100° C. for 1 hour. Hereby, a positive electrode was prepared.

Preparation of Secondary Battery

The positive electrode that had been cut to a diameter of 9.2 mm by punching, 20 mg of LYBC, and 60 mg of LPS were stacked on top of one another in this order in an insulating external cylinder. The resulting multilayer body was pressure-molded at a pressure of 740 MPa to form a multilayer body including a positive electrode and a solid-electrolyte layer. The thickness of the positive electrode included in the multilayer body including a positive electrode and a solid-electrolyte layer was 60 µm.

Subsequently, metal In (thickness: 200 µm), metal Li (thickness: 200 µm), and metal In (thickness: 200 µm) were stacked on top of one another in this order, on a surface of the solid-electrolyte layer which was other than the surface that was in contact with the positive electrode. The resulting multilayer body was pressure-molded at a pressure of 80 MPa to form a bipolar electrochemical cell including a positive electrode, a solid-electrolyte layer, and a counter electrode. In this electrochemical cell, the positive electrode was a working electrode and the counter electrode was a reference electrode.

Subsequently, a stainless steel current collector was attached to the top and bottom of the electrochemical cell. Each of the stainless steel current collectors was provided with a current collection lead.

Then, the inside of the insulative external cylinder was cut off from the outside atmosphere and hermetically sealed with an insulative ferrule.

Finally, the electrochemical cell was bound with 4 bolts in the vertical direction in order to apply a contact pressure of 150 MPa to the electrochemical cell.

A secondary battery of Example 1 was prepared in the above-described manner. In the secondary battery prepared in Example 1, the positive electrode included the ion conductor material according to the present disclosure. In the ion conductor material included in the secondary battery prepared in Example 1, the molar ratio of the modification group included in the resin binder to the halide solid-electrolyte material was 0. The acid value of the resin binder included in the ion conductor material was 0.

Example 2

In the preparation of the slurry of the ion conductor material, the LYBC fine powder, unmodified SEBS ("Tuftec N504" produced by Asahi Kasei Corporation, acid value: 0 mg-$CH_3ONa$/g), and maleic anhydride-modified SEBS ("Tuftec M1913" produced by Asahi Kasei Corporation, acid value: 10 mg-$CH_3ONa$/g) were weighed such that a mass ratio between the LYBC fine powder, the unmodified SEBS, and maleic anhydride-modified SEBS was LYBC fine powder:unmodified SEBS:maleic anhydride-modified SEBS=1:0.020:0.0022. In this ion conductor material, the halide solid-electrolyte material was LYBC and the resin binder included unmodified SEBS and maleic anhydride-modified SEBS. A secondary battery of Example 2 was prepared as in the method described in Example 1 above, except the above.

The molar ratio of the modification group included in the resin binder to the halide solid-electrolyte material in the ion conductor material included in the secondary battery prepared in Example 2 was determined using Formula (3) below on the basis of the acid values of unmodified SEBS and maleic anhydride-modified SEBS constituting the resin binder. The molar ratio of the modification group included in the resin binder to LYBC, which is the halide solid-electrolyte material, calculated using Formula (3) below was 0.0002.

Molar ratio of modification group=[{(Acid value of unmodified SEBS)×(Mass of unmodified SEBS)}/{(Molecular weight of $CH_3ONa$:54.02 g/mol)×1000}+{(Acid value of maleic anhydride-modified SEBS)×(Mass of maleic anhydride-modified SEBS)}/{(Molecular weight of $CH_3ONa$×1000}]/{(Mass of LYBC)/(Molecular weight of LYBC:411.35 g/mol)} (3)

The acid value of the resin binder included in the ion conductor material included in the secondary battery prepared in Example 2 was determined using Formula (4) below. The acid value of the resin binder calculated using Formula (4) below was 1 mg-$CH_3ONa$/g.

Acid value of resin binder={(Acid value of unmodified SEBS)×(Mass of unmodified SEBS)+(Acid value of maleic anhydride-modified SEBS)×(Mass of maleic anhydride-modified SEBS)}/{(Mass of unmodified SEBS)+(Mass of maleic anhydride-modified SEBS)} (4)

Comparative Example 1

In the preparation of the slurry of the ion conductor material, the LYBC fine powder, unmodified SEBS ("Tuftec N504" produced by Asahi Kasei Corporation, acid value: 0 mg-$CH_3ONa$/g), and maleic anhydride-modified SEBS ("Tuftec M1913" produced by Asahi Kasei Corporation, acid value: 10 mg-$CH_3ONa$/g) were weighed such that a mass ratio between the LYBC fine powder, the unmodified SEBS, and maleic anhydride-modified SEBS was LYBC fine powder:unmodified SEBS:maleic anhydride-modified SEBS=1:0.017:0.0043. In this ion conductor material, the halide solid-electrolyte material was LYBC and the resin binder included unmodified SEBS and maleic anhydride-modified SEBS. A secondary battery of Comparative Example 1 was prepared as in the method described in Example 1 above, except the above.

The molar ratio of the modification group included in the resin binder to the halide solid-electrolyte material in the ion conductor material included in the secondary battery prepared in Comparative Example 1 was determined using Formula (3) used in Example 2 on the basis of the acid values of unmodified SEBS and maleic anhydride-modified SEBS constituting the resin binder. The molar ratio of the modification group included in the resin binder to LYBC, which is the halide solid-electrolyte material, calculated using Formula (3) above was 0.0003.

The acid value of the resin binder included in the ion conductor material included in the secondary battery prepared in Comparative Example 1 was determined using Formula (4) used in Example 2. The acid value of the resin binder calculated using Formula (4) above was 2 mg-$CH_3ONa$/g.

Comparative Example 2

In the preparation of the slurry of the ion conductor material, the LYBC fine powder and maleic anhydride-modified SEBS ("Tuftec M1913" produced by Asahi Kasei Corporation, acid value: 10 mg-$CH_3ONa$/g) were weighed such that a mass ratio between the LYBC fine powder and maleic anhydride-modified SEBS was LYBC fine powder: maleic anhydride-modified SEBS=1:0.022. In this ion conductor material, the halide solid-electrolyte material was LYBC and the resin binder was maleic anhydride-modified SEBS. A secondary battery of Comparative Example 2 was prepared as in the method described in Example 1 above, except the above.

The molar ratio of the modification group included in the resin binder to the halide solid-electrolyte material in the ion conductor material included in the secondary battery prepared in Comparative Example 2 was determined using Formula (5) below on the basis of the acid value of maleic anhydride-modified SEBS constituting the resin binder. The molar ratio of the modification group included in the resin binder to LYBC, which is the halide solid-electrolyte material, calculated using Formula (5) below was 0.002.

Molar ratio of modification group=[{(Acid value of maleic anhydride-modified SEBS)×(Mass of maleic anhydride-modified SEBS)}/{(Molecular weight of $CH_3ONa$×1000)}]/{(Mass of LYBC)/(Molecular weight of LYBC)} (5)

The acid value of the resin binder included in the ion conductor material included in the secondary battery prepared in Comparative Example 2 was 10 mg-$CH_3ONa$/g, which is the acid value of maleic anhydride-modified SEBS.

Battery Evaluation

Charge-Discharge Test

A charge-discharge test was conducted using a specific one of the batteries prepared in Examples 1 and 2 and Comparative Examples 1 and 2 under the following conditions.

The battery was placed in a thermostat kept at 25° C.

The battery was charged to a voltage of 3.7 V (vs LiIn) at a current density corresponding to a current of 0.05C rate (20-hour discharge rate) relative to the theoretical capacity of the positive electrode active material (Li(Ni, Co, Mn)$O_2$).

The battery was then discharged to a voltage of 1.9 V (vs LiIn) at a current density corresponding to a current of 0.05C rate.

The charge capacity, discharge capacity, and charge-discharge efficiency (=(discharge capacity/charge capacity)× 100) of each of the batteries prepared in Examples 1 and 2 and Comparative Examples 1 and 2 were determined in the above-described manner. Table 1 lists the results.

TABLE 1

| | Molar ratio of modification group in ion conductor material | Acid value of resin binder (mg-$CH_3ONa/g$) | Charge capacity (mAh/g) | Discharge capacity (mAh/g) | Charge-discharge efficiency (%) |
|---|---|---|---|---|---|
| Example 1 | 0 | 0 | 198 | 172 | 86.9 |
| Example 2 | 0.0002 | 1 | 200 | 168 | 84.3 |
| Comparative Example 1 | 0.0003 | 2 | 152 | 120 | 78.9 |
| Comparative Example 2 | 0.002 | 10 | 170 | 136 | 79.9 |

Discussions

A comparison between the results of Examples 1 and 2 and the results of Comparative Examples 1 and 2 described in Table 1 confirms that a battery including an ion conductor material such that the molar ratio of the modification group included in the resin binder to LYBC was less than or equal to 0.0002 had a charge capacity close to 200 mAh/g, which is the theoretical capacity of the positive electrode, and the charge-discharge efficiency of the battery was increased.

This proves that the use of the ion conductor material according to the present disclosure increases the charge-discharge efficiency of a battery. Note that the ion conductor material according to the present disclosure is an ion conductor material including a solid-electrolyte material including Li, M. and X and a resin binder, wherein the M is at least one selected from the group consisting of metal and metalloid elements other than Li, the X is at least one selected from the group consisting of F, Cl, Br, and I, and the molar ratio of a modification group included in the resin binder to the solid-electrolyte is less than or equal to 0.0002.

The battery according to the present disclosure may be used as, for example, a solid-state lithium-ion secondary battery.

What is claimed is:

1. An ion conductor material comprising a solid-electrolyte material and a resin binder,
wherein the solid-electrolyte material includes Li, M, and X,
wherein the M is at least one selected from the group consisting of metal and metalloid elements other than Li,
wherein the X is at least one selected from the group consisting of F, Cl, Br, and I, and
wherein a molar ratio of a modification group included in the resin binder to the solid-electrolyte material is less than or equal to 0.0002 and greater than 0.

2. The ion conductor material according to claim 1, wherein the solid-electrolyte material is represented by Composition Formula (1) below, $$Li_\alpha M_\beta X_\gamma \qquad (1)$$

where the $\alpha$, the $\beta$, and the $\gamma$ all represent a value of greater than 0.

3. The ion conductor material according to claim 1, wherein the M includes yttrium.

4. The ion conductor material according to claim 1, wherein the resin binder includes a thermoplastic elastomer.

5. The ion conductor material according to claim 4, wherein the thermoplastic elastomer includes styrene units.

6. The ion conductor material according to claim 5, wherein the thermoplastic elastomer is styrene-ethylene-butylene-styrene block copolymer.

7. The ion conductor material according to claim 1, wherein the resin binder has an acid value of less than or equal to 1 mg-$CH_3ONa/g$.

8. A battery comprising:
a positive electrode;
a negative electrode; and
an electrolyte layer interposed between the positive electrode and the negative electrode,
wherein at least one selected from the group consisting of the positive electrode, the negative electrode, and the electrolyte layer includes the ion conductor material according to claim 1.

9. An ion conductor material comprising a solid-electrolyte material and a resin binder,
wherein the solid-electrolyte material includes Li, M, and X,
wherein the M is at least one selected from the group consisting of metal and metalloid elements other than Li,
wherein the X is at least one selected from the group consisting of F, Cl, Br, and I,
wherein a molar ratio of a modification group included in the resin binder to the solid-electrolyte material is less than or equal to 0.0002, and
wherein the resin binder includes a thermoplastic elastomer, and the thermoplastic elastomer is styrene-ethylene-butylene-styrene block copolymer.

10. The ion conductor material according to claim 1, wherein the M is Y and at least one selected from the group consisting of metal and metalloid elements other than Li and Y.

11. The ion conductor material according to claim 1, wherein the modification group include a carboxylic group, a maleic anhydride group, an acyl group, a hydroxyl group, a sulfa group, a sulfanyl group, a phosphate group, a phosphonate group, an isocyanate group, an epoxy group, a silyl group, an amino group, a nitrile group, or a nitro group.

* * * * *